United States Patent
Ageneau (12)
(10) Patent No.: US 6,183,001 B1
(45) Date of Patent: Feb. 6, 2001

(54) DEVICE FOR ATTACHING A SUPPORT TO A CHILD'S PUSHCHAIR, PUSHCHAIR AND SUPPORT EQUIPPED WITH SUCH A DEVICE

(75) Inventor: Laurent Ageneau, Cholet (FR)

(73) Assignee: Ampafrance S.A., Cholet (FR)

( * ) Notice: Under 35 U.S.C. 154(b), the term of this patent shall be extended for 0 days.

(21) Appl. No.: 08/927,672

(22) Filed: Sep. 10, 1997

(30) Foreign Application Priority Data

Sep. 10, 1996 (FR) ................................. 96 11035
Jul. 7, 1997 (FR) ................................. 97 08615

(51) Int. Cl.[7] .................................................. B62B 7/14
(52) U.S. Cl. ..................... 280/647; 280/658; 280/47.38
(58) Field of Search ................... 280/647, 649, 280/657, 658, 642, 650; 403/97, 100

(56) References Cited

U.S. PATENT DOCUMENTS

| | | | | |
|---|---|---|---|---|
| 4,892,327 | * | 1/1990 | Cabagnero | 280/650 |
| 5,056,805 | * | 10/1991 | Wang | 280/47.36 |
| 5,069,474 | * | 12/1991 | Tai | 280/658 |
| 5,201,535 | * | 4/1993 | Kato et al. | 280/30 |
| 5,203,577 | * | 4/1993 | Kato et al. | 280/30 |
| 5,769,447 | * | 6/1998 | Huang | 280/642 |
| 5,772,279 | * | 6/1998 | Johnson, Jr. | 297/130 |
| 5,865,447 | * | 2/1999 | Huang | 280/30 |
| 5,887,935 | * | 3/1999 | Sack | 296/122 |

FOREIGN PATENT DOCUMENTS

| | | |
|---|---|---|
| 41 37 575 C1 | 2/1993 | (DE) . |
| 0 010 453 A1 | 4/1980 | (EP) . |
| 0 050 017 A1 | 4/1982 | (EP) . |
| 0 090 668 A1 | 10/1983 | (EP) . |
| 0 0136 056 A2 | 4/1985 | (EP) . |
| 0 339 890 A2 | 11/1989 | (EP) . |
| 0 512 221 A1 | 11/1992 | (EP) . |
| 0 577 240 A1 | 1/1994 | (EP) . |
| WO 82/01305 | 4/1982 | (WO) . |
| WO 83/03393 | 10/1983 | (WO) . |

* cited by examiner

Primary Examiner—Brian L. Johnson
Assistant Examiner—Bridget Avery
(74) Attorney, Agent, or Firm—Pennie & Edmonds LLP (57) ABSTRACT

Device for attaching a body 28 to a child's pushchair, of the type having a chassis 1a, 1b resting on rolling wheels 3a, 3b and provided with two mounting pieces arranged one on either side of the body 28. The body 28 is equipped with two attachment elements 26a, 26b, each one cooperating with one mounting piece of the chassis 1a, 1b. Each attachment element 26a, 26b has at least one projecting lug capable of cooperating with at least one housing of the mounting piece, shaped appropriately for the lug.

15 Claims, 10 Drawing Sheets

DEVICE FOR ATTACHING A SUPPORT TO A CHILD'S PUSHCHAIR, PUSHCHAIR AND SUPPORT EQUIPPED WITH SUCH A DEVICE

BACKGROUND OF THE INVENTION

The subject of the present invention is a device for attaching a body to a child's pushchair making it possible to fit and remove the body from the pushchair in a simple and reliable way. The term body is understood to mean any object that can accommodate a child, such as a cot, a carrycot, a seat, etc., and which can be installed on a pushchair.

Various types of child's pushchair are known. In a first type, illustrated in particular in French Patent 2,693,162 (AMPAFRANCE), the pushchair has a folding chassis and a body made of fabric held by rods. The pushchair can be folded very satisfactorily and the body can pivot, for example so that a seated and a lying-down position can be offered. However, the need to be able to take the body out of the pushchair chassis has arisen, this especially being the case if the body used is a carrycot with rigid non-folding shell. It then is necessary to take the carrycot out of the pushchair before folding the latter.

A second type of pushchair is also known, from European Patent Application No. 0,339,890 (HESTAIR MACLAREN), and this type comprises a chassis supporting a seat that can be angled with respect to the chassis and which can be taken out of and put back in the chassis. The chassis has two lateral seat mounts in the form of inverted V's and with ribs on their edges. The seat comprises two lateral pieces which have a central recess in the shape of an inverted V to cooperate with a mount of the chassis and with two grooves which the ribs of the mount can enter. Such a system is relatively fragile, unstable before it is locked if one end of the seat is pulled or pushed and not very easy to manipulate. This is because the ribs on the mounts and the ribs on the pieces of the seat have small dimensions which, besides their fragility, forces an operator who wishes to put a seat back in the pushchair to position each piece of the seat simultaneously and precisely above the corresponding mount of the pushchair chassis. Should such positional accuracy not be achieved, there is a risk that one or both pieces of the seat may not engage with the ribs on the corresponding mounts, and the operator runs the risk of the seat dropping to the ground.

Furthermore, the shape of the mounts means that the movements of mounting or dismantling the seat from the pushchair chassis need to be more or less at right angles to the position of the body. Thus, if the mounts are in a position such that the seat once installed will be horizontal, then the movement of the seat needs to be more or less vertical. When the position of the mounts is such that the seat once installed will be at an angle, the movement for installing the seat on the chassis needs to be more or less at right angles to the angle at which the seat is going to be inclined. It is thus clear that installing the seat on the chassis becomes a particularly tricky operation, as the operator has both to position each piece of the seat laterally with respect to the corresponding mount and to position the seat at such an angle that installation is possible. Another drawback of this type of pushchair is that the buttons for altering the angle of the seat and for unlocking it with a view to removing it from the pushchair chassis are extremely close together, which may lead to a user confusing them.

SUMMARY OF THE INVENTION

The object of the present invention is to produce a device for attaching a body to a pushchair which allows the body to be stable even when it is not locked, which is robust enough and in which the body, while being installed, is guided with respect to the chassis in a way that considerably reduces the risk of the body, and therefore the child therein, being dropped.

The device for attaching a body to a child's pushchair, of the type comprising a chassis resting on rolling means and provided with two mounting pieces arranged one on either side of the body, the body being equipped with two attachment elements each one cooperating with one mounting piece of the said chassis. Each attachment element comprises at least one projecting lug capable of cooperating with at least one housing of the mounting piece, shaped appropriately for the said lug. Thus a body which is naturally stable with respect to the chassis even before locking is obtained.

Advantageously, the lug comprises at least two lug portions and the housing comprises at least two housing portions.

In a preferred embodiment of the invention, the lug comprises a means of guiding the entry of the lug into the housing, in the form of an oblique lower portion of the lug. This lower portion of the lug is capable of projecting out from beneath the housing. Thus a body offered up above the chassis with no special accuracy can be fixed to this chassis without the risk of dropping it.

In one embodiment of the invention, the lug comprises a means of immobilizing the lug in the housing, this means being in the form of a cylindrical upper portion of the said lug. If, through not paying sufficient care, an operator attempts to press on or raise one end of the body, the upper portion of the lug will become jammed in the housing, preventing any destabilizing of the body.

In one embodiment of the invention, the mounting pieces comprise a means for laterally guiding the entry of the lug into the housing, this means being in the form of a lip extending from the upper edge of the mounting piece upwards and towards the centre of the body, and surfaces for longitudinal guidance which are arranged one on each side of the lug, and the attachment elements comprise a means for laterally guiding the entry of the lug into the housing, this means being in the form of bevelled portions arranged on one lateral face.

In one embodiment of the invention, the attachment elements comprise a lateral protrusion on the chassis side that cooperates with a recess in the mounting piece so as to limit the clearance between the body and the chassis. The lateral protrusions may have a rounded shape to make it easier for them to enter their respective recesses.

As a preference, the device comprises means of operating locking means for the attachment element, these being in the form of a linearly-manipulated operating button designed with an inactive position and a pushed-in active position that keeps the locking means unlocked as long as the attachment element remains in the housing of the mounting piece.

Advantageously, the mounting pieces comprise means of operating locking means for the attachment element, these being arranged on the body side and comprising a tab articulated to the said mounting piece and which when tilted allows the attachment element to be locked and unlocked. As the buttons for altering the angle of the body are generally arranged on the outer sides of the chassis rather than between the chassis and the body, the risk of confusing the locking mechanisms with the angle of inclination mechanisms is reduced.

In one embodiment of the invention, at least one attachment element comprises at least one recess formed on a lateral wall of a lug and designed to cooperate with a locking means that comprises at least one protrusion integral with the tab and capable of projecting into a housing in the mounting piece through a hole in the edge of the said housing. The purpose of the operating tab will immediately be evident to the operator, and this will make it possible to reduce the risk of manipulation error.

In one embodiment of the invention, the protrusion is bevelled so that entry of the lug into the corresponding housing pushes the protrusion aside and makes the tab tilt.

In one embodiment of the invention, the mounting pieces comprise a device for tilting the body, this device being equipped with operating means mounted some on each side of the chassis.

In an alternative form, at least one of the lugs of at least one attachment element projects partially out beneath a wall of one end of a housing so as to prevent the said lug from coming out of its housing before the other lug of the same attachment element comes out of its housing. Removing the body from the chassis therefore requires a two-stage movement, the first stage being to get the other lug out and the second stage being to get the first lug out, and this reduces the risk of incorrect manipulation of the body.

In one embodiment of the invention, the attachment elements comprise two additional lugs.

The attachment element may be in the form of an adapter which includes a means of holding a seat equipped with some other type of attachment. The holding means may comprise a fork projecting upwards.

Another subject of the present invention is a child's pushchair equipped with such a body-attachment device, and a support for a child equipped with such an attachment device. A support is understood to mean any element capable of accommodating a child in the seated or lying-down position such as a cot, a carrycot, seat, child carrier for cars, etc.

Of course the pushchair chassis may be of any known type, folding or otherwise, and the support may also be one of many different types, for example a seat made of fabric held by a tubular frame, a rigid seat which can also be used as a car seat, a semi-rigid folding seat, a carrycot with a rigid shell, etc.

BRIEF DESCRIPTION OF THE DRAWING

The invention will be better understood from studying the detailed description of some embodiments taken as non-limiting examples and illustrated by the appended drawings in which.

DETAILED DESCRIPTION OF THE PREFERRED EMBODIMENT

Figure 1:
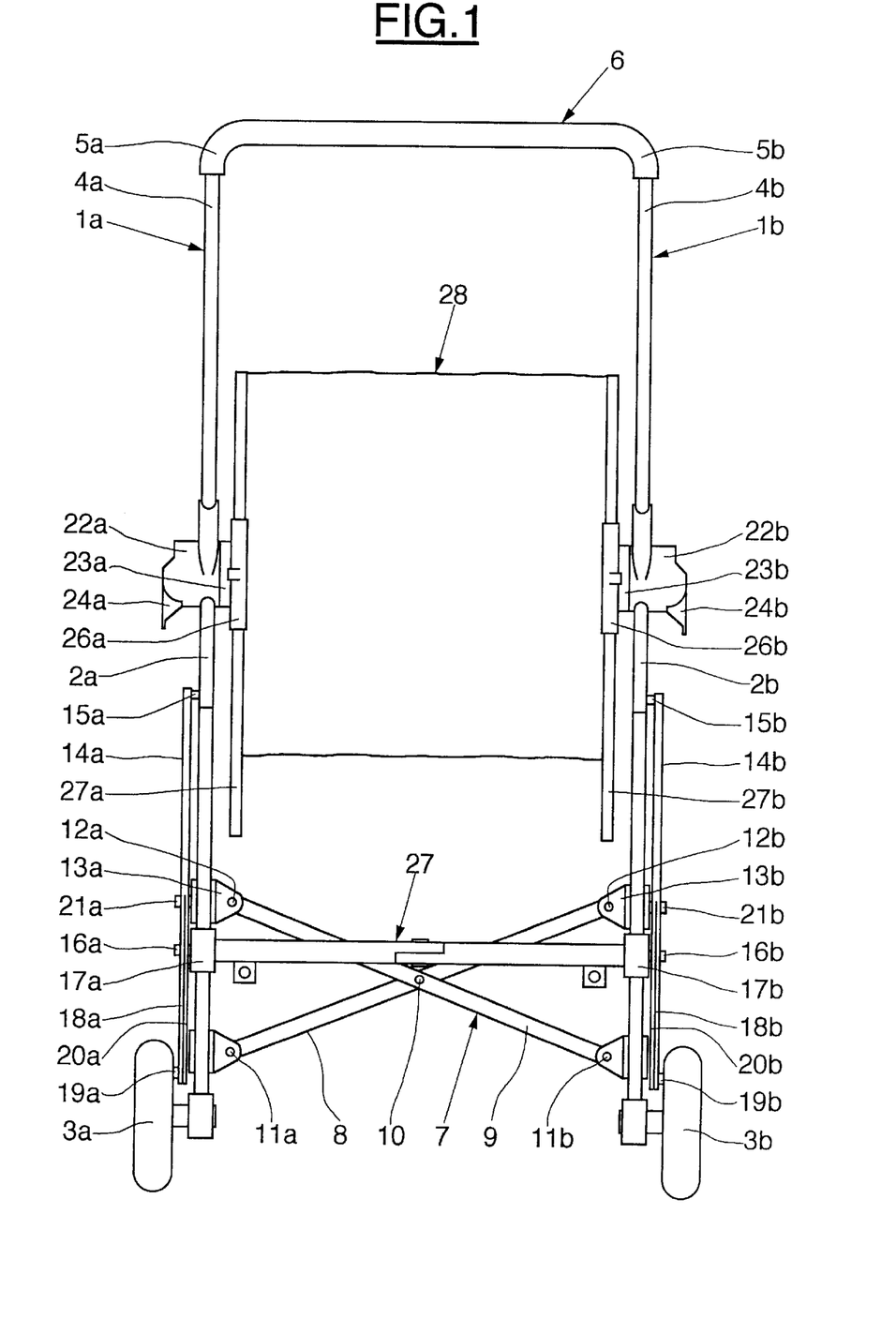
FIG. 1 is a front elevation of a pushchair equipped with an attachment device according to the invention.

As illustrated in FIG. 1, the pushchair comprises two lateral chassis assemblies referenced 1a and 1b overall. These two lateral chassis assemblies are identical, and a description will be given of the elements that make up the lateral assembly 1a, which will be given the suffix a, it being understood that the lateral chassis assembly 1b has the same elements, which will be given the suffix b.

The lateral chassis assembly 1a comprises a front frame member 2a and a rear frame member that is not visible in FIG. 1. The front frame member 2a at its lower end has an axle for a front wheel 3a or, in an alternative form, a wheel unit consisting of two wheels.

Still forming part of the lateral chassis assembly 1a, there is a pushing arm 4a which at its top end has a horizontally bent handle region 5a. It will be observed that the respective handle regions 5a, 5b of the two pushing arms 4a, 4b are joined together to form a transverse handle bar referenced 6 overall.

At the back of the pushchair there is a chassis 7 in the shape of an articulated X, consisting of a branch 8 and a branch 9 articulated at their middle by the axle 10 so as to have the shape of an X. The lower ends of the branches 8 and 9 can pivot about axles 11a, 11b which are fixed with respect to the rear frame members close to the lower end thereof. The upper ends of the branches 8 and 9 are articulated about axles 12a, 12b which form part of sliding sleeves 13a, 13b through which the respective rear frame members pass so that they can slide therein.

All these elements may advantageously be made in the form of metal tubes, for example of light alloy. A connecting rod 14a is articulated at its upper end to the axle 15a which forms part of the lower end of the pushing arm 4a. Near its lower end, the connecting rod 14a is articulated to an axle 16a that forms part of the lower part of the rear frame member. It will be noted that the axle 16a is mounted, in the example illustrated, in a sleeve 17a which is fixed with respect to the rear frame element and fixed between the axles 11a and 12a of the branches 8 and 9 of the X-shaped rear chassis 7 when the pushchair is in the fully unfolded position. The connecting rod 14a continues beyond its articulation axle 16a in the form of an extension 18a which at its lower end has an articulation axle 19a with respect to which a control linkage 20a can pivot, the upper end of which linkage is articulated by the axle 21a to the sliding sleeve 13a which forms part of the upper end of the branch 9 of the X-shaped rear chassis 7.

The same set-up applies to the lateral chassis element b, the corresponding control linkage 20b being articulated to the sliding sleeve 13b that forms part of the upper end of the branch 8 of the chassis 7. The connecting rods 14a and 14b and the associated control linkages 20a and 20b are preferably arranged outside the lateral chassis elements 1a and 1b between these and the rear wheels and consist of links made of flat metal bar so as to reduce the bulk of the assembly while making it very rigid.

Also arranged in the lateral chassis assembly 1a is a sliding sleeve 22a through which the front frame member 2a and the pushing arm 4a can pass and slide freely therein. The sleeve 22a, just like the similar sleeve 22b in the lateral chassis assembly 1b, can occupy a position against top stops when the pushchair is in the fully unfolded position illustrated in FIG. 1. It can also occupy a position against bottom stops, this position being defined by a stop, not depicted, placed on the front frame member 2a, this being when the pushchair is in the fully folded position and is in the process of being folded up. The sleeve 22a is provided with a mounting piece 23a arranged on the inside of the chassis 1a, 1b. The sleeve 22a also supports an operating lever 24a arranged on the outside of the chassis 1a, 1b.

The pushchair also comprises a rigid footrest 27 provided with two folding branches articulated by a central axle.

The sleeve 22a and the mounting piece 23a (FIG. 2) take an attachment element 26a which forms part of a rod 27a that can take a fabric or the like forming a body 28 for accommodating the child.

Figure 2:
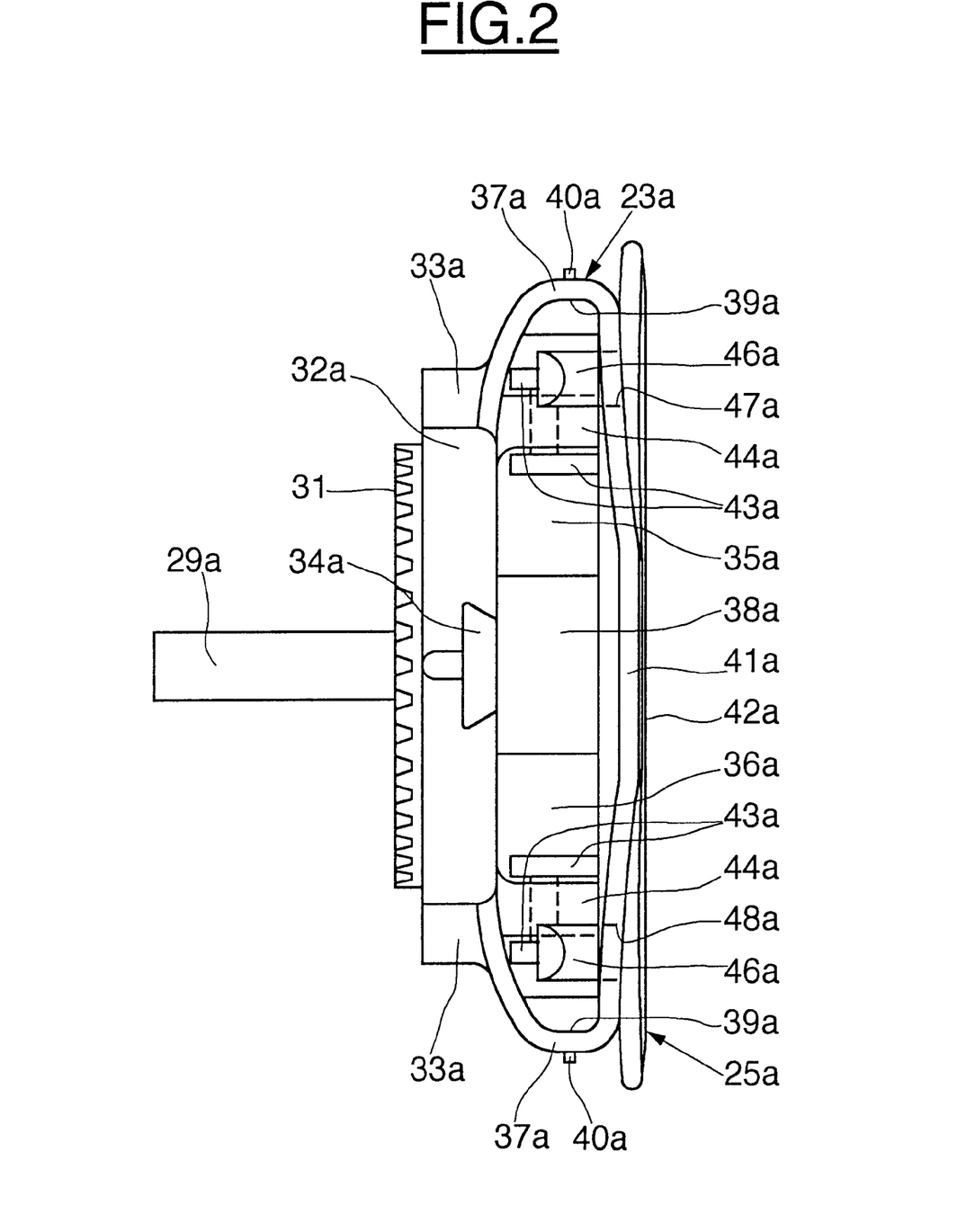
FIG. 2 is a plan elevation of a mounting piece for an attachment device according to the invention.
Figure 3:
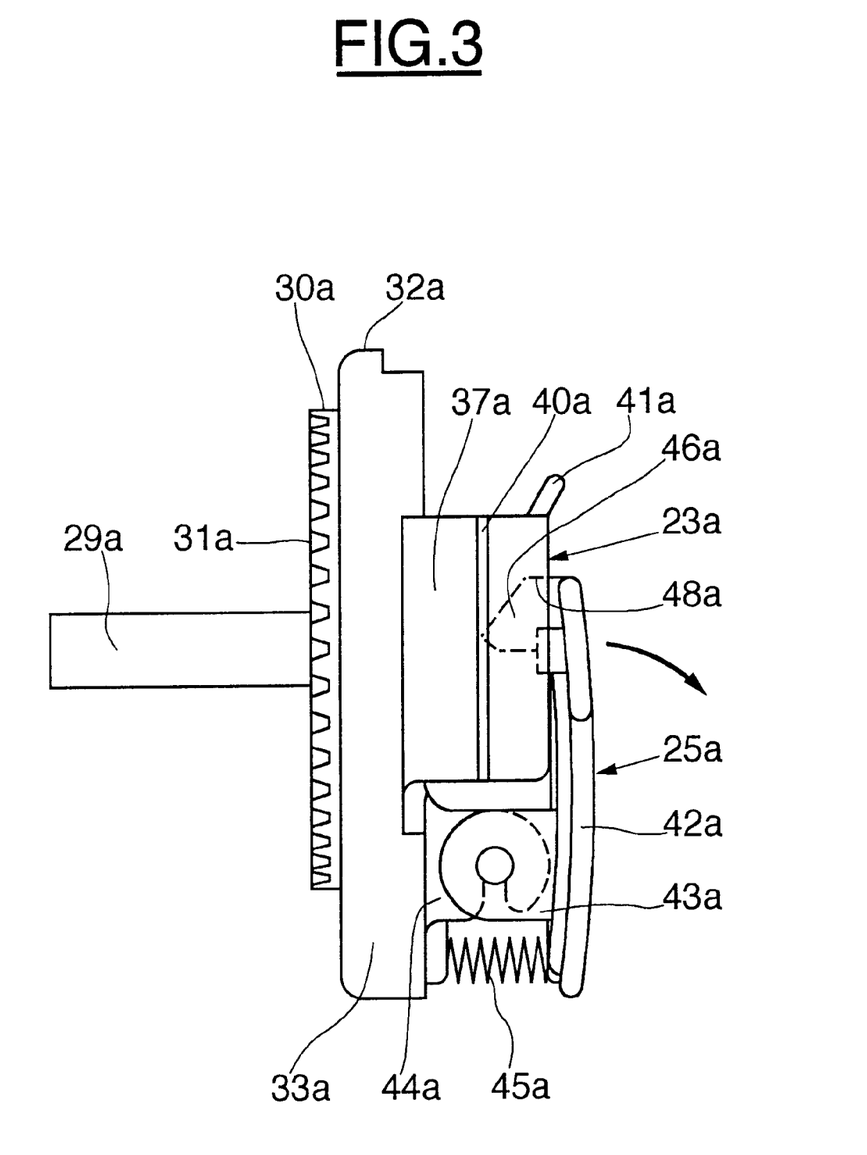
FIG. 3 is a front elevation of the same mounting piece as FIG. 2.

As illustrated in FIGS. 2 and 3, the mounting piece 23a is intended to be inserted into the centre of the sleeve 22a and take an attachment element 26a (FIG. 1). The mounting piece 23a comprises an axle 29a capable of cooperating with a hole with a corresponding diameter, not depicted, in the sleeve. At the end of the axle 29a on the body side, the mounting piece 23a comprises a ring 30a the diameter of which greatly exceeds that of the axle 29a and which is provided on its face on the same side as the axle 29a with a plurality of uniformly spaced teeth 31 that can cooperate with corresponding teeth of the sleeve so that the angle of the body 28 with respect to the sleeves 22a and 22b and therefore with respect to the pushchair as a whole can be adjusted.

In order to vary the angle of the body 28, the very first step is to operate the levers 24a and 24b, of which the end that lies inside the sleeves 22a and 22b tends to drive the mounting pieces 23a and 23b inwards and to release the teeth 31 from the corresponding teeth of the sleeves 22a and 22b. In this way the angle of the body 28 can be altered, for example between the seated position and the lying-back position. Once the desired position has been reached, the levers 24a and 24b are locked, and this causes the mounting pieces 23a and 23b to move towards the outside of the pushchair and the teeth 31 to reengage with the corresponding teeth of the sleeves 22a and 22b.

The mounting piece 23a comprises a cylindrical portion 32a adjacent to the ring 30a on the opposite side to the teeth 31. The cylindrical portion 32a comprises two bulges 33a forming wedges and arranged at the bottom of the mounting piece 23a. The cylindrical portion 32a also comprises, on the opposite side to the ring 30a, a radial housing 34a with oblique edges.

Near the cylindrical portion 32a, on the opposite side to the ring 30a, the mounting piece 23a defines two more or less cylindrical housing portions 35a and 36a. The housing portions 35a and 36a are delimited by the edge 37a of the mounting piece 23a and by a central portion 38a coaxial with the cylindrical portion 32a, with the ring 30a and with the axle 29a. The internal walls 39a of the housing portions 35a and 36a are cylindrical and mutually parallel so that they can cooperate with the attachment element 26a, with a small amount of clearance. However, the opposite ends of the housing portions 35a and 36a to the central portion 38a taper slightly at the bottom of the said housing portions in order to present the right shape for the attachment element. Near the central portion 38a, the edge 37a of the mounting piece 23a is bent outwards to form a lip 41a capable of making it easier for the attachment elements 26a to enter the housing portions 35a and 36a of the mounting piece 23a and extending upwards and towards the centre of the body.

Two ribs 40a are arranged at each end of the edge 37a, parallel to the walls 39a and on the outside of the housings 35a and 36a.

The mounting piece 23a also comprises an operating tab 25a provided with a flat plate 42a arranged in contact with the edge 37a on the side opposite the cylindrical portion 32a and with devises 43a arranged in pairs at each end of the bottom of the plate 42a and articulated to two corresponding devises 44a that form part of the bulges 33a of the cylindrical portion 32a, about a common axle. The tab must tilt in the direction of the arrow in FIG. 3. Provided under the devises 43a, 44a is a spring 45a arranged between the cylindrical portion 32a and the plate 42a and exerting a force that opposes the tilting in the aforementioned direction. The tab 25a also comprises two protrusions 46a in the form of hooks arranged on the plate 42a on the same side as the edge 37a and projecting into the housing portions 35a, 36a through holes 47a, 48a in the edge 37a, in the position of rest.

Figure 4:
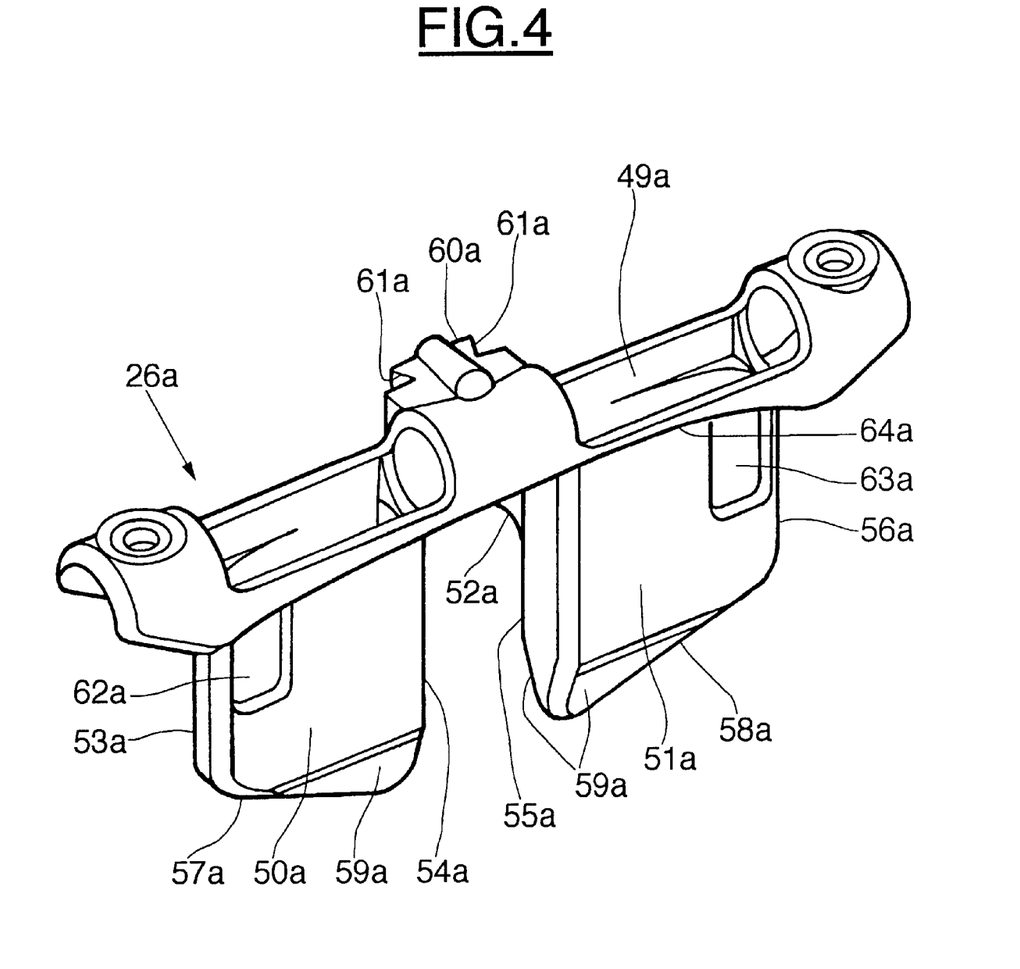
FIG. 4 is a perspective view of an attachment device according to the invention.
Figure 5:
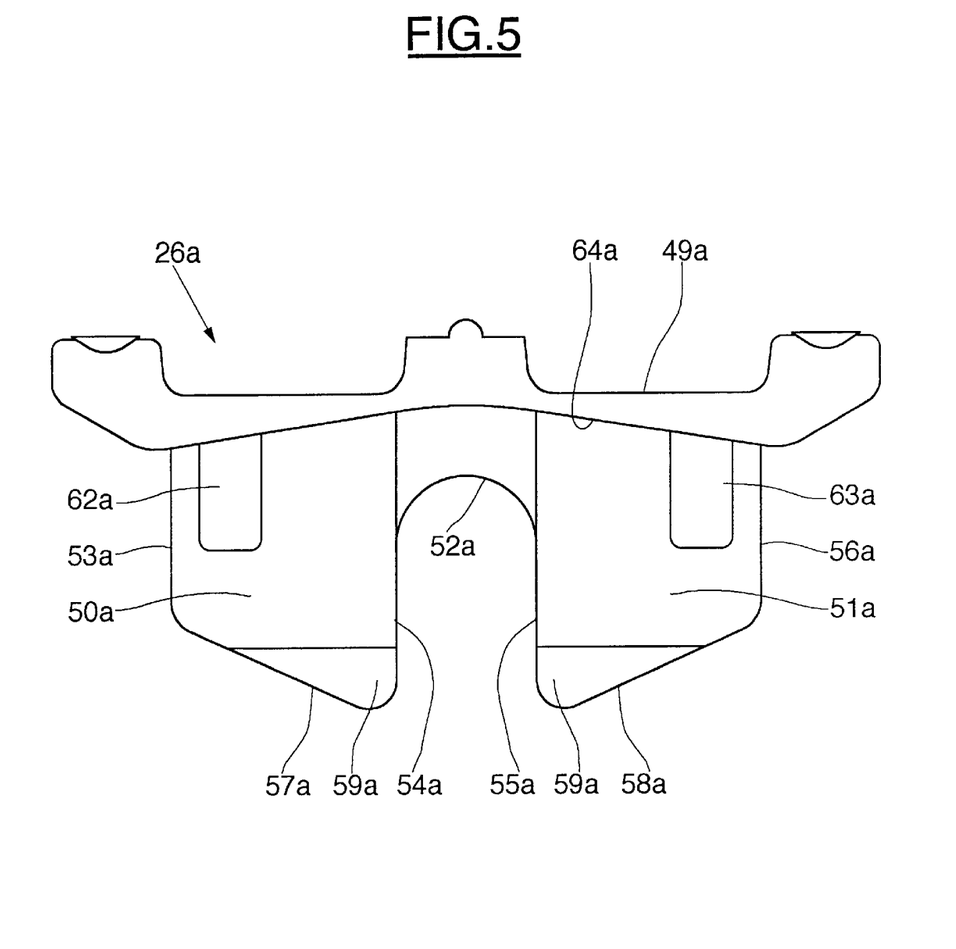
FIG. 5 is a rear elevation of the element depicted in FIG. 4.

As can be seen in FIG. 4, the attachment element 26a comprises a tubular upper portion 49a capable of receiving the rod 27a of the body 28 (FIG. 1). Two lug portions 50a and 51a extend from the tubular portion 49a downwards. The lug portions 50a and 51a are separated by a recess of rounded shape 52a. The walls 53a, 54a of the lug portion 50a and 55a, 56a of the lug portion 51a are cylindrical so that these lug portions 50a and 51a can be fitted snugly into the housing portions 35a and 36a of the mounting piece 23a illustrated in FIGS. 2 and 3. The lug portions 50a and 51a are also provided near their lower end with oblique portions 57a, 58a which are intended to guide the attachment element 26a with respect to the mounting piece 23a and are dimensioned in such a way that they can project out beneath their housing portions 35a, 36a. The lug portions 50a, 51a are provided on their two lateral faces with bevelled portions 59a intended for the lateral guidance of the attachment element 26a with respect to the mounting piece 23a.

The attachment element 26a comprises a lateral protrusion 60a arranged above the recess 52a separating the two lug portions 50a and 51a. The protrusion 60a is appropriately shaped for the housing 34a of the mounting piece 23a. The protrusion 60a has a rounded shape at its lower end, which is not visible in FIG. 4, to make it easier for the said protrusion to cooperate with the housing 34a in the mounting piece 23a. The protrusion 60a is dovetail-shaped with vertical oblique edges 61a cooperating with the corresponding edges of the housing 34a. The lug portions 50a and 51a are provided with recesses 62a, 63a arranged between the bevelled portions 59a and the tubular portion 49a and designed to cooperate with the protrusions 46a of the locking tab 25a.

The tubular portion 49a comprises a cutout 64a on the same side as the recesses 62a, 63a, and the shape of which is designed to fit that of the lip 41a on the edge 37a of the mounting piece 23a (FIG. 3).

Figure 6:
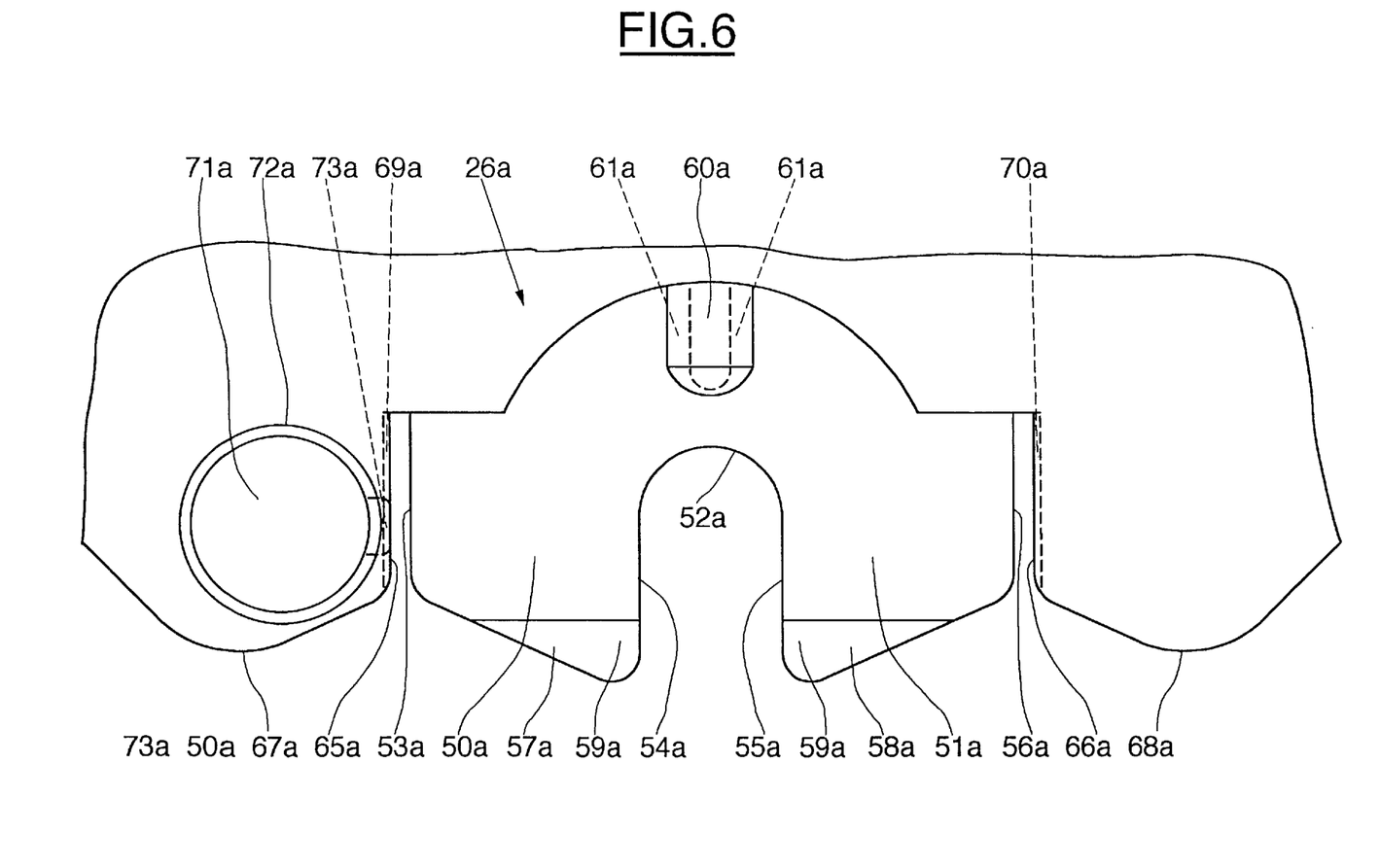
FIG. 6 is a front elevation of an alternative form of the attachment element of FIG. 4.

The attachment element 26a illustrated in FIG. 6 is particularly well suited to a seat that has a rigid shell. The attachment element 26a comprises planar surfaces 65a and 66a arranged respectively parallel to and facing the walls 53a and 56a of the lug portions 50a and 51a and extended by oblique guiding surfaces 67a and 68a opposite the lug portions 50a and 51a. The guiding surfaces 67a and 68a are capable of coming into contact with the edge 37a (FIGS. 2 and 3) when the attachment element 26a is introduced into a mounting piece 23a. Slots 69a and 70a are provided in the planar surfaces 65a and 66a to cooperate with the ribs 40a on the mounting piece 23a, thus assisting with guidance.

An operating button 71a is provided in a hole 72a near the planar surface 65a and has a lateral protrusion 73a which, when the said button 71a is pushed in, can snap-fit behind the rib 40a of a mounting piece 23a, and is held by the said rib 40a so long as the attachment element 26a remains on its mounting piece 23a. When the attachment element 26a is taken out, the protrusion 73a disengages from the rib 40a and the button 71a returns to its inactive initial position under the action of a spring that has not been depicted.

The way in which the attachment device works is as follows. When the body 28 is installed on the pushchair and the desire is to remove it, the very first step is to tilt the tab 25a in order to disengage the protrusions 46a from the recesses 62a, 63a into which they project.

It will be noted that in this position in which the tab 25a is unlocked, the attachment element 26a remains stable with respect to the mounting piece 23a because of the blocking effect of the vertical surfaces 53a, 54a, 55a and 56a of the lug portions 50a and 51a on the corresponding walls 39a and 40a of the housing portions 35a and 36a of the mounting piece 23a and of the oblique walls 61a of the protrusions 60a on the corresponding walls of the housing 34a. For example, if pressure is applied to the bottom end of the rod 27a of the body 28, the attachment element 26a will tend to press against the edge 37a of the housing portion 36a. This onset of pivoting will cause the vertical wall 55a to jam against the central portion 38a and the vertical wall 53a to jam against the wall 39a of the housing portion 35a. This blocking prevents any unintentional disengagement of the attachment element 26a from the mounting piece 23a. The same occurs, for similar reasons, if attempts at raising the lower end of the rod 27a of the body 28 are made.

To remove the body 28, it is therefore necessary to grasp hold of the rod 27a near the attachment element 26a and pull it in the direction at right angles to the said rod 27a. In this way it becomes possible to remove the attachment element 26a from the mounting piece 23a irrespective of its orientation. The same procedure is followed with the attachment element 26b. The operations of tilting the tab 25a and of grasping hold of the rod 27a can be carried out with just one hand and simultaneously.

Conversely, when the desire is to install the body 28 on the pushchair, the attachment element 26a is offered up above the mounting piece 23a, if possible, at the same angle. However, if the attachment element 26a is offered up horizontal while the mounting piece 23a is angled by±10°, the oblique surfaces 57a, 58a of the lug portions 50a, 51a allow the attachment element 26a to adopt the correct position with respect to the mounting element 23a. When the lug portions 50a and 51a are offered up close to the housing portions 35a and 36a they are guided laterally by the lip 41a of the mounting piece 23a which tends to make them go into their respective housing portions 35a and 36a and prevents the possibility of the body 28 being dropped. The lip 41a cooperates with the bevelled portions 59a provided on the lug portions 50a and 51a and makes it possible to make good any misalignment of the order of±5°. In the longitudinal direction, the lug portions 50a and 51a are guided with respect to their housing portions 35a and 36a by their oblique surfaces 57a and 58a. The same is true of installing the attachment element 26b on the mounting piece 23b. Thus the operator can offer up the body 28 with a relatively large lateral, longitudinal and angular margin of error without the risk of dropping the said body 28.

Once the lug portions 50a and 51a have begun to enter their respective housing portions 35a and 36a, the lateral protrusion 60a enters the housing 34a of the mounting piece 23a and the bevelled portions 59a come into contact with the protrusions 46a of the tab 25a and gradually push them aside, this causing the tab 25a to tilt and the spring 45a to become compressed. Once the movement of the attachment element 26a is finished, the protrusions 46a abruptly penetrate the recesses 62a, 63a of the lug portions 50a, 51a and the tab 25a returns to its initial position, and this prevents any subsequent movement of the attachment element 26a with respect to its mounting piece 23a.

Figure 7:
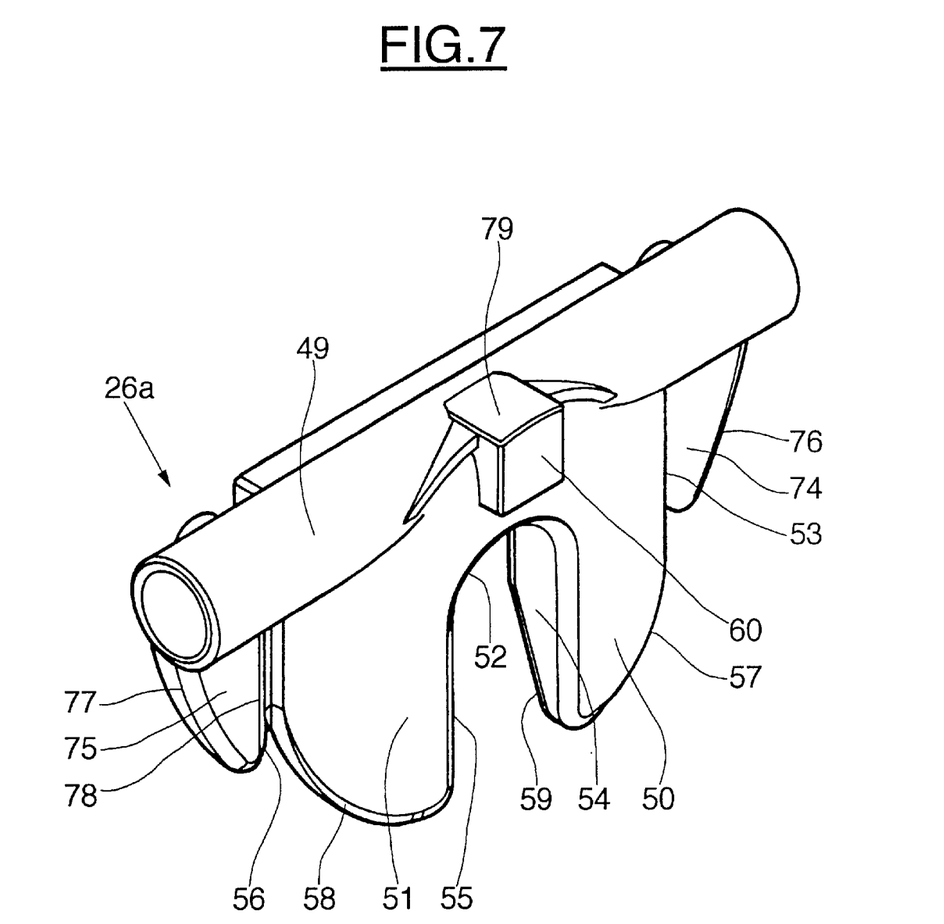
FIG. 7 is an alternative form of FIG. 4.

In FIG. 7, the attachment element also comprises two additional lugs 74 and 75, one on each side of the lug portions 50 and 51, and the outer faces 76 and 77 of which are rounded. The face 78 of the additional lug 75 adjacent to the wall 56 of the lug portion 51 is vertical and arranged at a distance from the wall 56 that corresponds to the thickness of the edge 37 of the mounting piece 23. The protrusion 60 has a rounded upper surface 79.

Figure 8:
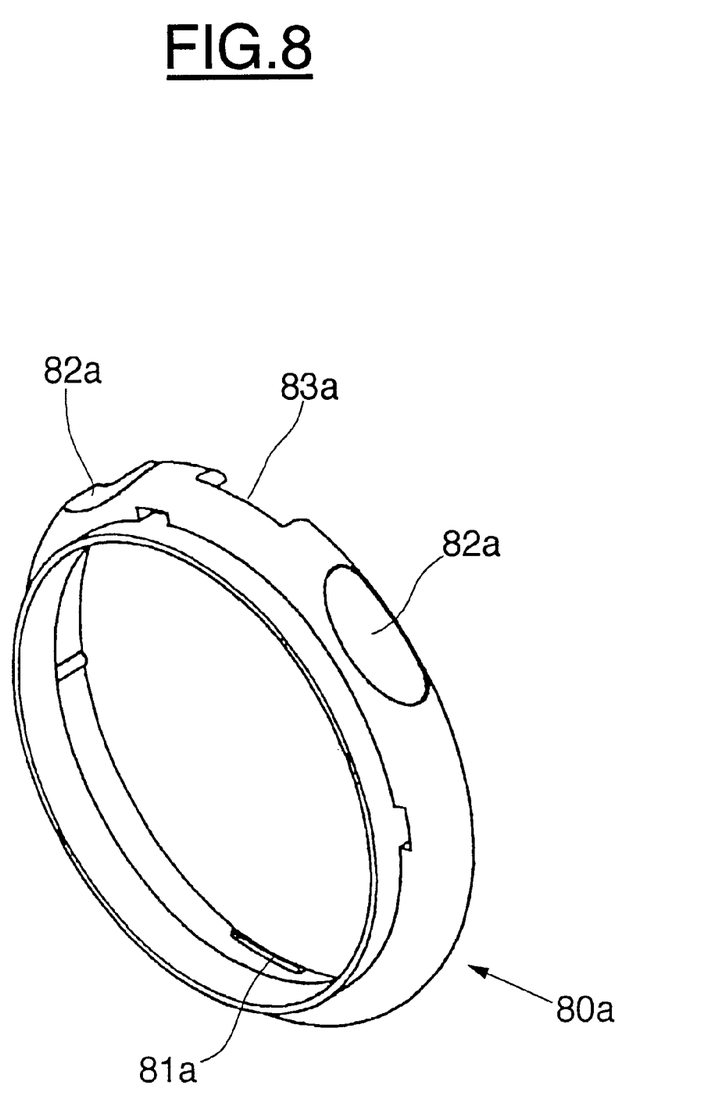
FIG. 8 is a perspective view of a locking ring.
Figure 9:
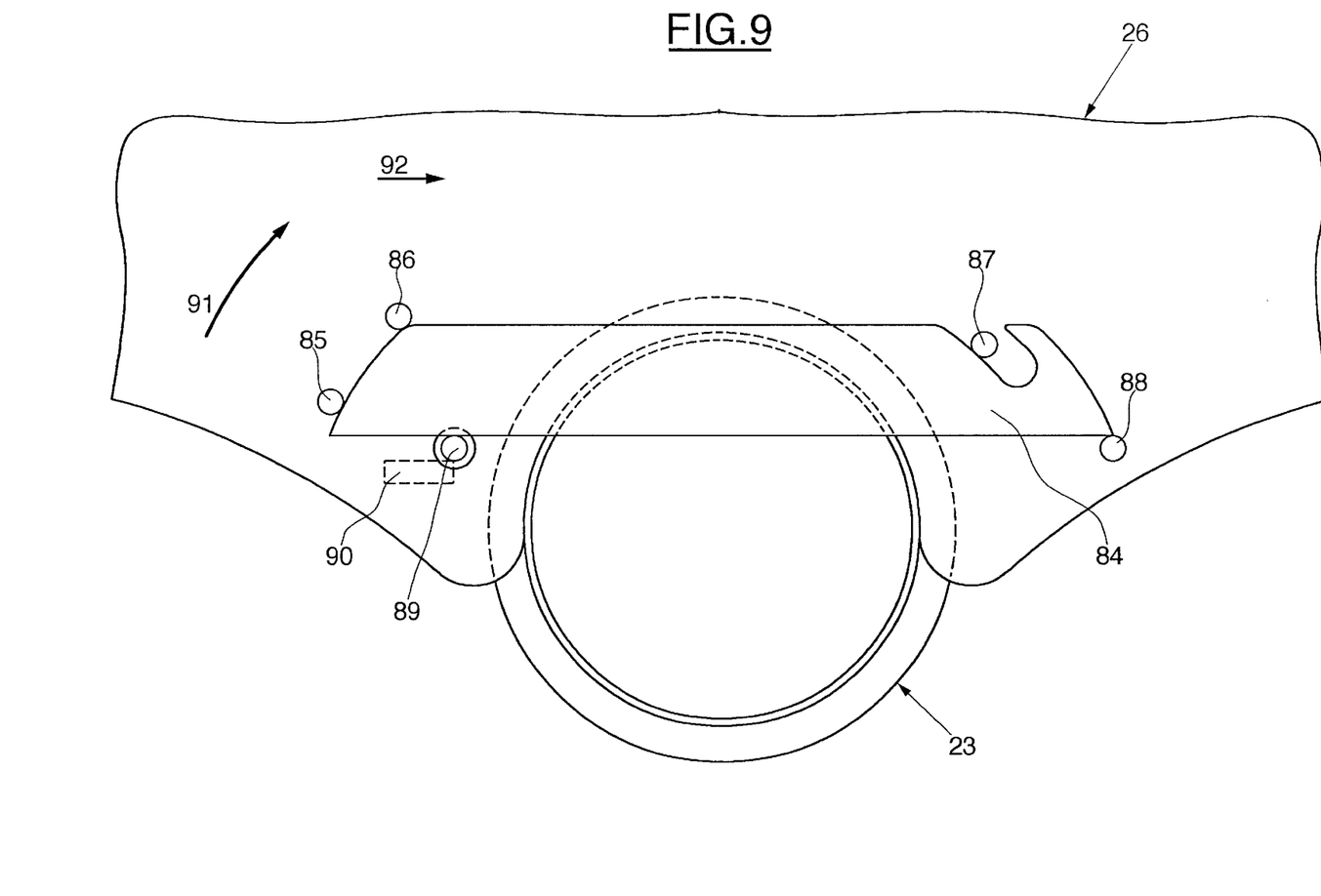
FIG. 9 is a diagrammatic side view of another embodiment of the invention.

The sleeve 22a may also be provided with a locking ring 80a illustrated in FIG. 8 and surrounding the cylindrical portion 32a of the mounting piece 23a, which in this case will then not have the bulges.

The ring 80a is of annular overall shape and on its bore comprises at least one lug 81a projecting radially inwards, and capable, when the ring 80a is mounted on the cylindrical portion 32a of the mounting piece 23a of cooperating with a slot, not depicted, so as to limit the angular travel of the ring 80a with respect to the mounting piece 23a. On its external periphery, the ring 80a has regions 82a intended to prevent the operator's fingers slipping on the said ring 80a and which may be striated, present lumps or have any other means intended to avoid slipping. On the side of the ring 80a adjacent to the housings 35a and 36a of the mounting piece 23a there is a lateral cutout 83a. The depth of the cutout 83a is more or less equal to the depth of the housing 34a provided in the mounting piece 23a.

The way in which the attachment device works is as follows. When the body 28 is installed on the pushchair and the desire is to remove it, the very first step is to rotate the ring 80a so as to align the cutout 83a of the said ring 80a with the housing 34a of the mounting piece 23a into which housing the protrusion 60 of the attachment element 26a projects. The reason behind this is that when the cutout 83a and the housing 34a are not aligned, the ring 80a radially covers the housing 34a and prevents any movement of the protrusion 60 and therefore of the attachment element 26a.

For safety reasons, it may prove advantageous to oblige the user to detach the body from the pushchair using a twofold movement, for example rotation then translation of one with respect to the other. As illustrated in FIG. 7, it is possible to provide a mounting piece 23 that has a locking bar 84 supporting the attachment element 26 via stationary points of contact 85, 86, 87 and 88 and a mobile locking piece 89. The mobile locking piece 89 is operated by a cam 90 which itself is actuated via an operating means. When the locking piece 89 is projecting, in the active position, the attachment element 26 is immobilized with respect to the bar 84. When the locking piece 89 is withdrawn to the inactive position, the attachment element 26 can be separated from the bar 84, first of all by raising the attachment element 26 near the points of contact 85 and 86 by pivoting it about the point of contact 88, then by a translational movement that takes the points of contact 87 and 88 away from the bar 84. The attachment element 26 is separated from the mounting piece 23 first of all with a movement in the direction of the arrow 91 then with a movement in the direction of the arrow 92. When the body has to be put back in the pushchair, the reverse operation is carried out.

Figure 10:
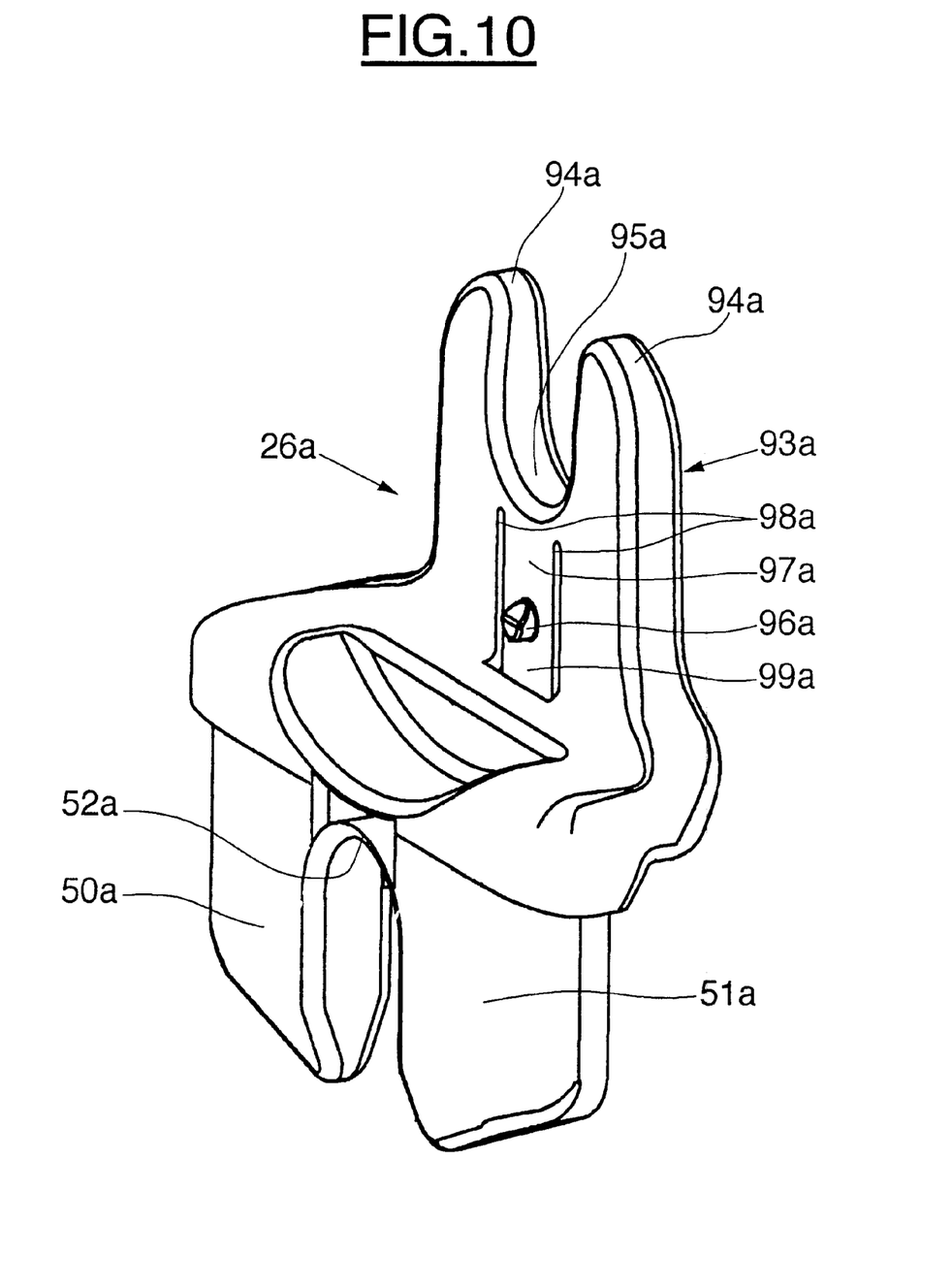
FIG. 10 is a perspective view of an alternative form of attachment device.

In FIG. 10, the attachment element 26a comprises a fork 93a pointing upwards away from the lugs.

The fork 93a has two prongs 94a separated by a recess 95a to accommodate a seat, for example a seat with a rigid shell, that has corresponding attachment means. The fork 93a has a laterally projecting lug 96a and an elastic portion 97a on which the lug 96a is mounted.

The elastic portion 97a is separated from the rest of the fork 93a by slots 98a and extends downwards to form a control rod 99a, the lower part of which is not visible in FIG. 10.

The lug 96a allows the seat to be blocked automatically, unblocking being obtained by action on the control rod 99a to cause the lug 96a to retract.

The attachment element 26a thus serves as an adapter for seats of varying types.

Thanks to the invention, an attachment device is obtained which is robust, simple, and extremely safe on account of the fact that the body and its attachment elements drop naturally into their respective mounting pieces even if the operator's movements are relatively inaccurate. Finally, the ease of operation for the user is improved, as the user can immediately see what the locking tab is supposed to do without confusing it with the orientating control lever which is on the other side of the pushchair frame.

What is claimed is:

1. Device for releasably attaching a body to a child's pushchair comprising a chassis resting on rolling means and provided with two mounting pieces arranged one on either side of the body and each having at least one housing, the body being equipped with two attachment elements each one cooperating with one mounting piece of the chassis, each attachment element comprising an upper portion and at least one projecting lug capable of cooperating with at least one housing of the mounting piece, shaped appropriately for the lug, the lug extending from the upper portion downwards and comprising a means for guiding the lug to enter into the housing, in the form of an oblique lower portion of the lug, the lower portion of the lug being capable of projecting out from beneath the housing.

2. Device according to claim 1, characterized in that the lug comprises at least two lug portions (50a, 51a) and in that the housing comprises at least two housing portions.

3. Device according to claim 1, characterized in that the lug comprises a means of immobilizing the lug in the housing, this means being in the form of a cylindrical upper portion of the said lug.

4. Device according to any claim 1, characterized in that the mounting pieces comprise a means for laterally guiding the entry of the lug into the housing, this means being in the form of a lip (41a) extending from the upper edge of the mounting piece upwards and towards the centre of the body, and surfaces (67a, 68a) for longitudinal guidance which are arranged one on each side of the lug, and in that the attachment elements comprise a means for laterally guiding the entry of the lug into the housing, this means being in the form of bevelled portions (59a) arranged on one lateral face.

5. Device according to claim 1, characterized in that the attachment elements comprise a lateral protrusion that cooperates with a recess in the mounting pieces so as to limit the clearance between the body and the chassis, the lateral protrusions having a rounded shape to make it easier for them to enter the recesses.

6. Device according to claim 1, further comprising means of operating locking means for the attachment element, these being in the form of a linearly-manipulated operating button (71a) designed with an inactive position and a pushed-in active position that keeps the locking means unlocked as long as the attachment element remains in the housing of the mounting piece.

7. Device according to claim 1, characterized in that the mounting pieces comprise means of operating locking means, the operating means comprising a tab articulated to the mounting pieces and which when tilted allows the attachment elements to be locked and unlocked.

8. Device according to claim 1, characterized in that the mounting pieces comprise a device for tilting the body, this device being equipped with operating means (24a, 24b) mounted on each side of the chassis.

9. Device according to claim 1, characterized in that at least one of the lugs of at least one attachment element projects partially out beneath a wall of one end of a housing so as to prevent the lug from coming out of the engagement unit the housing before the other lug of the same attachment element comes out of its housing.

10. Device according to claim 1, characterised in that the attachment elements comprise two additional lugs (65a, 66a).

11. Device according to claim 1, further comprising a means for holding a seat, in the form of a fork projecting upwards.

12. Device according to claim 7, characterized in that at least one attachment element comprises at least one recess (62a) formed on a lateral wall of a lug and designed to cooperate with a locking means that comprises at least one protrusion (46a) integral with the tab and capable of projecting into a housing in the mounting piece through a hole in the edge of the housing.

13. Device according to claim 12, characterized in that the protrusion is bevelled so that entry of the lug into the corresponding housing pushes the protrusion aside and makes the tab tilt.

14. Child's pushchair equipped with a device for releasably attaching a body to the pushchair, the pushchair comprising a chassis resting on rolling means and provided with two mounting pieces arranged one on either side of the body and each having at least one housing, the body being equipped with two attachment elements each one cooperating with one mounting piece of the chassis, each attachment element comprising an upper portion and at least one projecting lug capable of cooperating with at least one housing of the mounting piece, shaped appropriately for the lug, the lug extending from the upper portion downwards and comprising a means for guiding the lug to enter into the housing, in the form of an oblique lower portion of the lug, the lower portion of the lug being capable of projecting out from beneath the housing.

15. Support for a child, comprising a device for releasably attaching a body to a child's pushchair comprising a chassis resting on rolling means and provided with two mounting pieces arranged one on either side of the body and each having at least one housing, the body being equipped with two attachment elements each one cooperating with one mounting piece of the chassis, each attachment element comprising an upper portion and at least one projecting lug capable of cooperating with at least one housing of the mounting piece, shaped appropriately for the lug, the lug extending from the upper portion downwards and comprising a means for guiding the lug to enter into the housing, in the form of an oblique lower portion of the lug, the lower portion of the lug being capable of projecting out from beneath the housing.

* * * * *